United States Patent
Dreier et al.

[11] Patent Number: 6,026,702
[45] Date of Patent: Feb. 22, 2000

[54] OPERATING DEVICE WITH SINGLE-SHAFT ACTUATION

[75] Inventors: Loren Christopher Dreier, Milford; Jeff Austin, Milan; Peter B. Hartig, Plymouth, all of Mich.

[73] Assignee: ZF Friedrichshafen AG, Friedrichshafen, Germany

[21] Appl. No.: 09/018,646

[22] Filed: Feb. 4, 1998

[51] Int. Cl.[7] ............................................. F16H 63/34
[52] U.S. Cl. ................................. 74/473.21; 74/473.25; 74/473.26; 74/473.28
[58] Field of Search ................... 74/473.21, 473.25, 74/473.26, 473.27, 473.28, 473.1, FOR 102, FOR 104

[56] References Cited

U.S. PATENT DOCUMENTS

| | | | |
|---|---|---|---|
| 2,402,842 | 6/1946 | Rhodes | 74/473.26 |
| 3,513,717 | 5/1970 | Lickey et al. | |
| 4,503,727 | 3/1985 | Ballendux | 74/473.24 |
| 4,727,765 | 3/1988 | Schneider | 74/473.28 |
| 5,687,615 | 11/1997 | Takemura et al. | 74/473.26 |
| 5,737,969 | 4/1998 | Brown et al. | 74/473.25 |

FOREIGN PATENT DOCUMENTS

| | | |
|---|---|---|
| 0 395 241 | 10/1990 | European Pat. Off. |
| 393021 | 10/1908 | France. |
| 293488 | 8/1915 | Germany. |
| 4017957 | 12/1990 | Germany. |
| 58-189716 | 11/1983 | Japan. |
| 60-191823 | 9/1985 | Japan. |
| WO93/10377 | 5/1993 | WIPO. |
| WO 95/16869 | 6/1995 | WIPO. |

*Primary Examiner*—David A. Bucci
*Assistant Examiner*—William C Joyce
*Attorney, Agent, or Firm*—Davis and Bujold

[57] ABSTRACT

An operating device for actuating the shift mechanism in multi-ratio gear transmissions in motor vehicles, incorporating a shift rail (2) which is moveable in parallel to the gear axes and arranged in a transmission housing (30), this shift rail carries coupling devices (16, 18, 20, 22, 32, 42, 46, 50). The coupling devices form a connection between the shift rail (2) and the shift forks (4) of the engaging gears and, at the same time, block the shift forks (4) of the non-engaging gears. The coupling devices (16, 18, 20, 22, 32, 42, 46, 50) have detents (22, 26, 32, 36, 42, 60) by which the engaged gears can be blocked in their engaged position.

7 Claims, 4 Drawing Sheets

OPERATING DEVICE WITH SINGLE-SHAFT ACTUATION

BACKGROUND OF THE INVENTION

The invention concerns an operating device for a gearbox.

This type of operating device is already known from international patent application WO 95/16869.

The above describes an operating device with single-shaft actuation, incorporating a shift rail which can be displaced in parallel to the gear axes, this shift rail being arranged in a transmission housing. The shift rail carries coupling devices which form a link between the shift rail and the shift forks of the respective gear to be engaged. At the same time, the shift forks of the gears not to be engaged are blocked.

This type of operating device is problematic, since it has no facility provided for holding the desired gear in its engaged position once it has been engaged.

In addition, EP 0 395 241 also concerns an operating device with single-shaft actuation, incorporating a facility on the shaft rail to indicate axial movement of the shift rail relative to the housing, this axial movement being from a neutral position to an axially different position which represents an engaged gear.

This operating device has no means provided for blocking an engaged gear in its engaged position. By the same token, the above described means for determining axial movement are means which have to be arranged on the shift rail together with the shift forks, thus increasing assembly expenditure and costs.

The present invention is, therefore, based on the tasks of further developing the operating device described in WO 95/16869 and avoiding additional expenditures.

SUMMARY OF THE INVENTION

According to the invention, it is proposed to further develop an operating device for actuating multi-ratio motor vehicle gear transmissions, incorporating a shift rail which can be moved in parallel to the axes of gears of the transmission, this shift rail being arranged in a transmission housing and carrying coupling devices, these coupling devices, forming a link between the shift rail and the shift forks of the gears to be engaged, while at the same time, blocking the shift forks or swing forks of the non-engaging gears so that, ultimately, the coupling devices have means by which the engaged gears can be held in their engaged positions.

In an advantageous further development, these means are formed by elements which block the shift forks against the housing when the shift forks are in non-actuated condition and which also block the shift forks for the engaged gear when these shift forks are actuated.

An advantageous further development is shown by the means for blocking the gear in its engaged position, which are in the form of recesses, these recesses being formed in the coupling device and lying in a line with openings, into which engage detent elements which are, in turn, designed to form the connection between the shift rail and the shift forks.

BRIEF DESCRIPTION OF THE DRAWING(S)

The invention is described in more detail, by way of example, with reference to the accompanying drawings in which.

DESCRIPTION OF THE PREFERRED EMBODIMENT(S)

Figure 1:
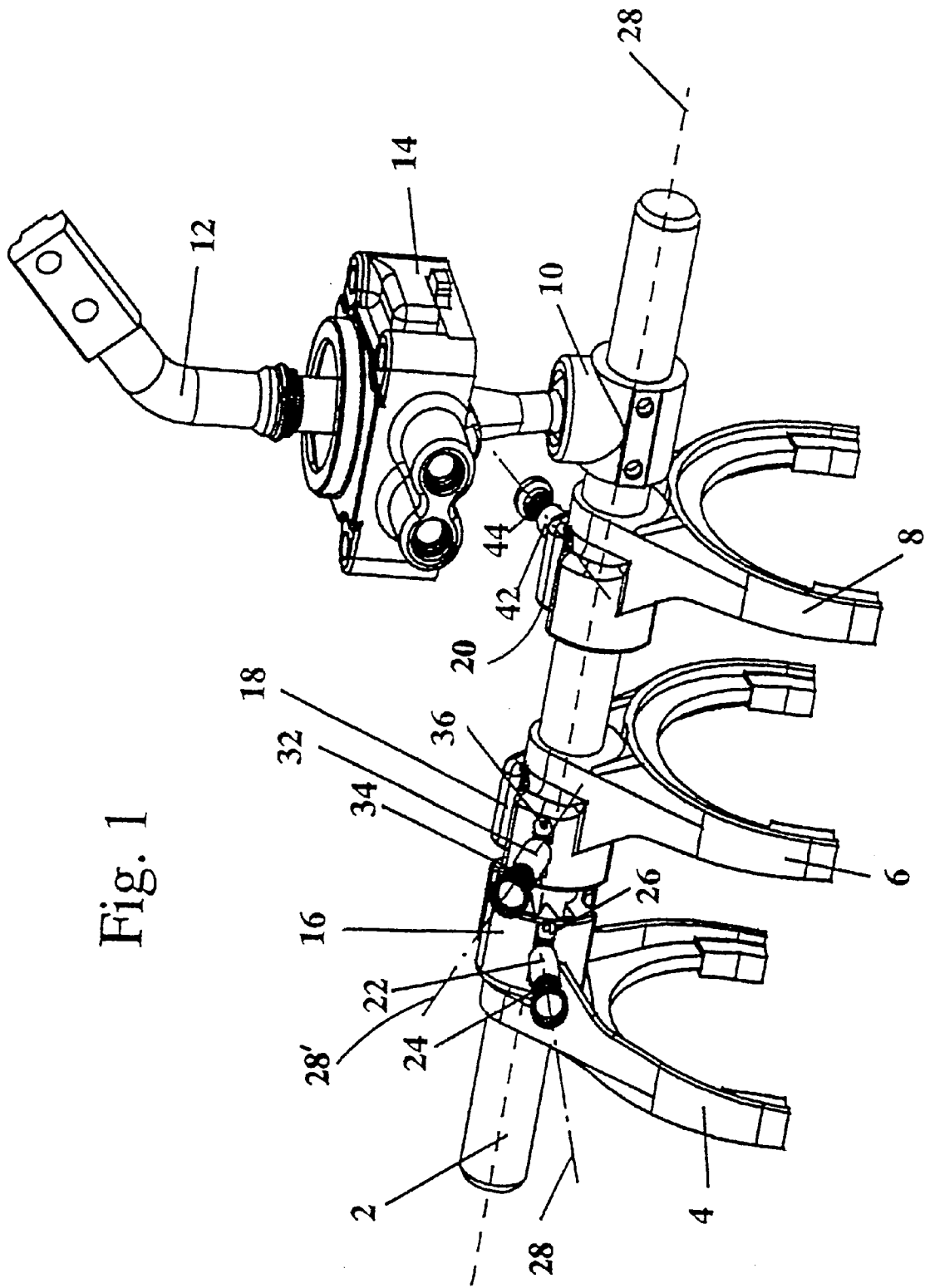
FIG. 1 is a diagrammatic perspective view of the operating device.

FIG. 1 is a perspective view of an operating device, according to the invention, with single-shaft actuation. Three shift forks (4, 6, 8) are arranged on a shift rail (2). A locator (10), permanently fixed to the shift rail (2), provides the connection to one shift lever (12). The shift lever (12) is held in a bracket (14) which is, in turn, arranged in a vehicle housing (not shown).

Figure 2A:
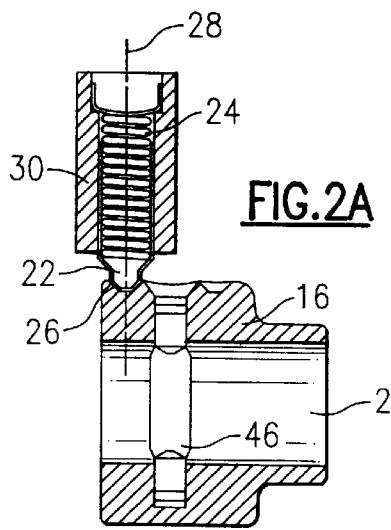
FIGS. 2A to 2F are diagrammatic views of the interaction between the coupling devices in the individual actuation stages.

Each shift fork (4, 6, 8) is permanently fixed to a corresponding hub (16, 18, 20). Referring now to FIG. 2A, a detent pin (22), fixed in the transmission housing (30) is preloaded towards the hub (16) by means of a spring (24), engages into the hub (16). Furthermore, the hub (16) has a recess (26) which is axially located next to the detent pin (22) along a theoretical axis (28).

Figure 2B:
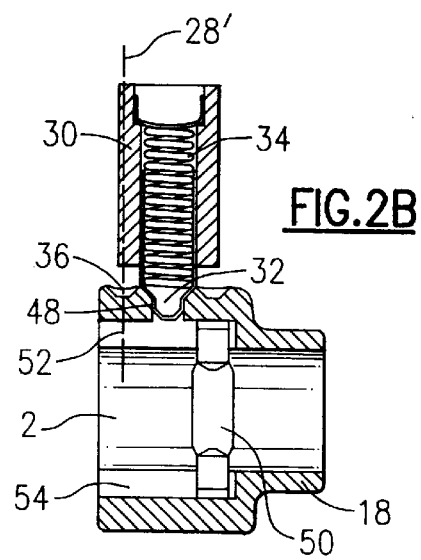

Referring now to FIG. 2B, a detent pin (32), fixed in the transmission housing (30) is preloaded towards the hub (18) by means of a spring (34), engages into the hub (18). Furthermore, the hub (18) has a recess (36) which is axially located next to the detent pin (32) along a theoretical axis (28').

A detent pin (42), fixed in the transmission housing (30) is preloaded towards the hub (20) by means of a spring (44), engages into the hub (20) in similar manner to those of hubs (16) and (18).

FIGS. 2A to 2F show the three stages of a shift from an engaged gear to the opposite-facing gear in the same gate via the neutral position. In each case, the hub of the actuated shift fork is shown opposite the hub of the non-actuated shift forks.

FIG. 2A shows an example of the hub (16) when a gear in a shift gate is engaged. The detent pin (22) is pushed back from the recess (26) against the spring (24) and towards the transmission housing (30). Fixed in the shift rail (2) is a crank rod (46) which can be rotated and axially displaced together with the shift rail (2). In FIG. 2A, the crank rod (46) is positively connected to the hub (16), thus axial movement of the shift rail (2) causes axial movement of the hub (16) and, therefore, actuation of a shift fork (4) supported on the hub (16). The spring (24) holds the detent pin (22) fixed in the recess (26) so that the hub (16) and the shift rail (2) are axially fixed. This means that the engaged gear is held engaged.

FIG. 2B shows an example of the hub (18) with the shift rail (2) in the same axial position as shown in FIG. 2A. The detent pin (32) is pushed into an opening (48) in the hub (18) by means of the spring (34). As a result, the hub (18) is locked against the housing (30). It is not possible to actuate a shift fork arranged on the hub (18). Each end of the crank rod (50), which is fixed on the shift rail (2), is located in a groove (52 or 54) in the hub (18) which extends axially into the hub (18). Consequently, axial displacement of the shift rail (2) and, therefore, of the crank rod (50), does not cause axial movement of the hub (18) since there is no positive connection between the hub (18) and the crank rod (50).

Figure 2C:
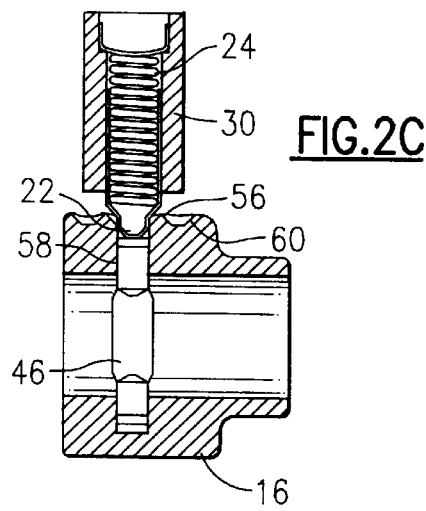

FIG. 2C shows the hub (16) in a neutral position. In this instance, the detent pin (22) has moved out of the recess (26)

shown in FIG. 2A and along the detent surface (56) before reaching the opening (58). Due to the crank rod (46) located in the opening (58), the detent pin (22) is prevented from entering into the opening (58) and, therefore, prevented from locking the hub (16) against the housing (30). Rather, an axial movement of the shift rail (2) causes the detent pin (22) to reach the recess (60) in the hub (16) (FIG. 2E). As in FIG. 2A, the crank rod (46) and the hub (16) form a positive connection, so that an axial movement of the shift rail (2) also causes an axial movement of the hub (16). Once the recess (60) (FIG. 2E) is reached, the gear, opposite the gear engaged in FIG. 2A, in the same shift gate, is engaged.

Figure 2D:
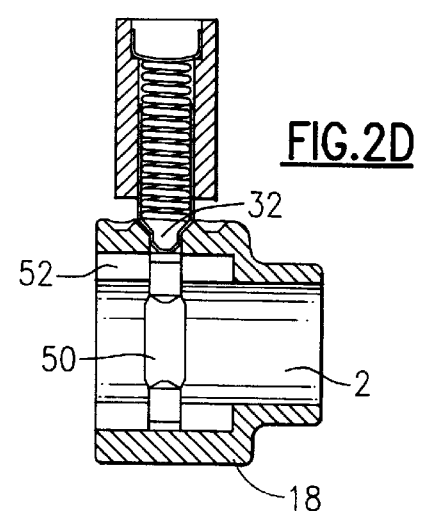
Figure 2E:
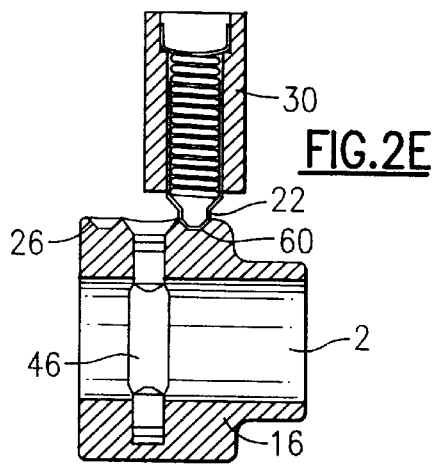
Figure 2F:
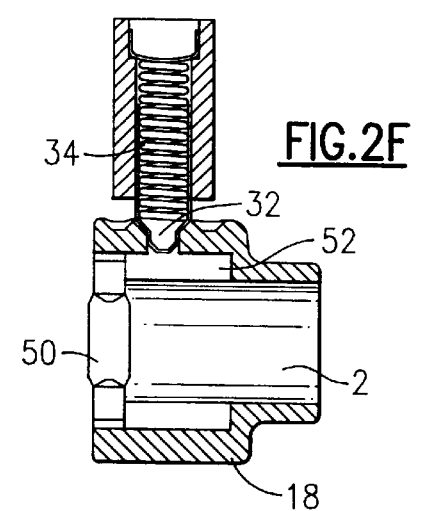

FIG. 2D shows the hub (18) and the crank rod (50) which is moved to a position beneath the detent pin (32) in the groove (52) due to the axial movement of the shift rail (2). The crank rod (50) can be axially moved within the groove (52) without also causing the hub (18) to move. FIG. 2F shows the hub (18) in the position in which the shift rail (2) brought the hub (16) shown in FIG. 2E into the engaged position. The shift rail (2) axially moves the crank rod (50) to the left in the groove (52) without moving the hub (18). Due to the detent pin (32), the hub (18) remains locked against the housing (30).

Figure 3A:
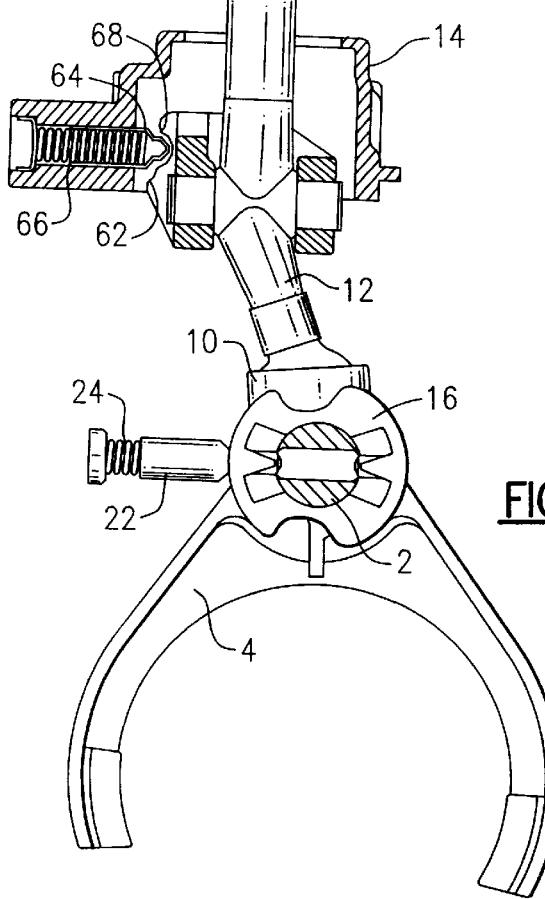
FIGS. 3A and 3B are diagrammatic views of the actuated shift fork.

FIG. 3A shows a cross-section of the shift rail (2) in the hub (16) area. The shift fork (4) is fixed on the hub (16). The detent pin (22) engages into the hub, being biased towards the hub (16) by means of the spring (24), before coming to rest against the housing.

The shift lever (12) engages into the locator (10) on the shift rail (2), the shift lever being fixed in the bracket (14) in the housing (30). The shift lever (12) has a detent surface (62) which works together with a detent pin (64) arranged in the bracket (14). The detent pin (64) is biased towards the detent surface (62) by means of a spring (66) on the bracket (14). The shift lever (12) is located in a central shift gate and the detent pin (64) is located in the recess (68) in the detent surface (62). If another shift gate is selected, the detent pin (64) is moved along the detent surface (62) against the spring (66) force so that the driver can feel a slight resistance when selecting the shift gate. This resistance can be felt due to the incline of the detent surface (62) and becomes greater as the angle at which the detent surface (62) exits the recess (68) becomes steeper. As a result, the shift lever (12) is always biased towards the middle shift gate.

Figure 3B:
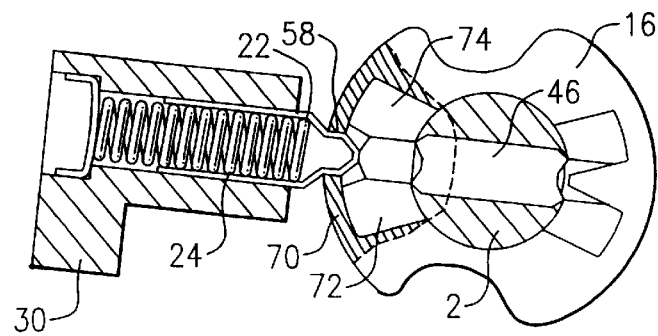

FIG. 3B shows an enlarged view of the engagement range of the detent pin (22) and hub (16). The crank rod (46) engages in the hub (16) in such a way that actuating the crank rod (46) by moving the shift rail (2) away from the drawing plane causes actuation of the shift fork (4) attached to the hub (16). The cutaway and shaded section (70) of the hub (16) has two grooves (72, 74) within which the crank rod (46) can move when it is turned against the position shown by means of turning of the shift rail (2). In the position shown, the crank rod (46) and the hub (16) engage with one another. The crank rod (46) pushes the detent pin (22) against the spring (24) and back towards the housing, thus allowing actuation of the hub (16) and the shift fork (4).

Figure 4:
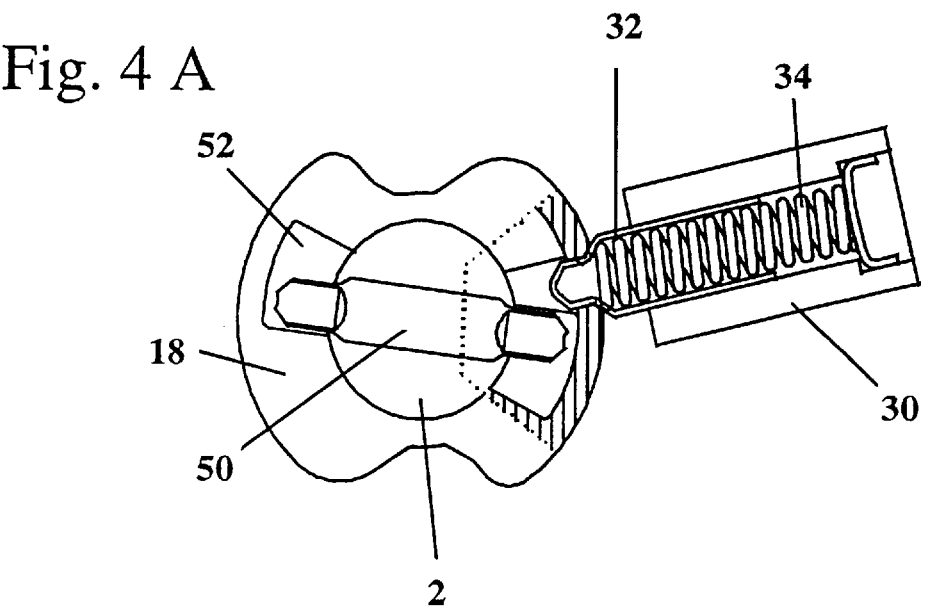
FIGS. 4A and 4B are diagrammatic views of the non-actuated shift forks.
Figure 4:
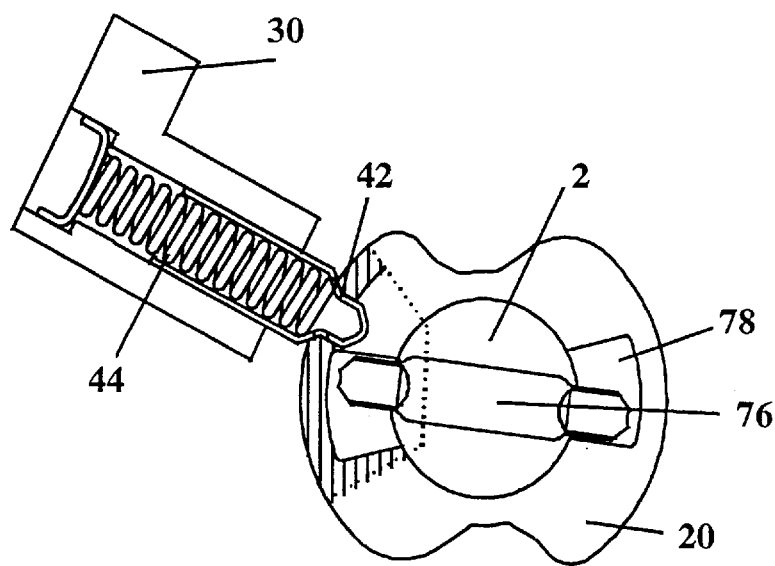

FIGS. 4A and 4B show the two other hubs (18, 20) with the shift rail (2) in the same position. The springs (34, 44) push the detent pins (32, 42) into the hub (18, 20). As a result, actuation of the hubs (18, 20) is prevented when the shift rail (2) is moved axially away from the drawing plane. At the same time, the crank rod (50) moves in the axial groove (52) within the hub (18) without moving the hub (18). Similarly, the crank rod (76) moves in the axial groove (78) within the hub (20) without moving the hub (20).

As used herein "shift forks" shall be construed to include "swing forks".

What is claimed is:

1. An operating device for actuating a shift mechanism of a multi-ratio gear transmission for a motor vehicle, the operating device comprising:

a transmission housing supporting a plurality of shiftable gears;

an elongate shift rail (2) being supported by the transmission housing (30), the shift rail (2) defining a longitudinal axis and being moveable along the longitudinal axis, and the shift rail (2) also being rotatable about the longitudinal axis to facilitate engagement of only a desired one of the plurality of shiftable gears;

a shift lever being coupled to the shift rail (2) for facilitating both longitudinal and rotational movement of the shift rail (2) for selection of a desired gear to be engaged;

a plurality of shift forks (4, 6, 8) being supported by the shift rail (2), and each one of the plurality of shift forks (4, 6, 8) being engageable with a desired shiftable gear to be engaged;

the shift rail (2) having a plurality of coupling mechanisms (16, 18, 20, 22, 32, 42, 46, 50) for forming a gear shifting connection between the shift rail (2) and a desired one of the plurality of shift forks (4, 6, 8) to be engaged while the plurality of coupling mechanisms (16, 18, 20, 22, 32, 42, 46, 50) also forming a locking connection between each non-engaged shift fork (4, 6, 8) and the transmission housing to prevent each non-engaged shift fork (4, 6, 8) from engaging a gear, the coupling mechanisms (16, 18, 20, 22, 32, 42, 46, 50, 76) comprise a plurality of crank rods (46, 50, 76) supported within a bore formed in the shift rail (2), and each crank rod (46, 50, 76) extends perpendicular to the longitudinal axis of the shift rail (2) for facilitating the shift connection between the shift rail (2) and the desired one of the plurality of shift forks (4, 6, 8);

the coupling mechanisms (16, 18, 20, 22, 32, 42, 46, 50, 76) having a plurality of detents facilitating the shift connection between the shift rail (2) and the desired one of the plurality of shift forks (4, 6, 8) to be engaged and the locking connection between each non-engaged shift fork (4, 6, 8) and the transmission housing; and wherein each said detent is supported within a cavity formed in the transmission housing (30) and each said detent is biased by a spring in a direction toward the shift rail.

2. The operating device according to claim 1, wherein, when one of the shift forks (4, 6, 8) is actuated, each one of the plurality of detents (22, 32, 42), facilitating the locking connection between each non-engaged shift fork (4,6, 8) and the transmission housing (30), is received within an opening (48, 58) through which the detent pin is biased to connect the coupling hub to the transmission housing (30).

3. The operating device according to claim 1 wherein each of said plurality of coupling mechanisms comprises a coupling hub (16, 18, 20) supported by the shift rail (2) and each coupling hub is fixedly connected to one of the plurality of shift forks to facilitate actuation thereof via the shift rail (2).

4. The operating device according to claim 3, wherein a plurality of crank rods (46, 50, 76) are supported by the shift rail (2), and each crank rod (46, 50, 76) extends perpendicular to the longitudinal axis of the shift rail (2); and each coupling hub (16, 18, 20) is selectively engageable with only one of the crank rods (46, 50, 76) to facilitate engagement of a desired gear associated with the shift fork (4, 6, 8) to be engaged while the remaining crank rods (46, 50, 76) are each freely movable within one of the coupling hubs (16, 18, 20) of the non-engaged shift forks (4, 6, 8) to prevent actuation thereof.

5. An operating device for actuating a shift mechanism of a multi-ratio gear transmission for a motor vehicle, the operating device comprising:

a transmission housing supporting a plurality of shiftable gears;

an elongate shift rail (2) being supported by the transmission housing (30), the shift rail (2) defining a longitudinal axis and being moveable along the longitudinal axis, and the shift rail (2) also being rotatable about the longitudinal axis to facilitate engagement of only a desired one of the plurality of shiftable gears;

a shift lever being coupled to the shift rail (2) for facilitating both longitudinal and rotational movement of the shift rail (2) for selection of a desired gear to be engaged;

a plurality of shift forks (4, 6, 8) being supported by the shift rail (2), and each one of the plurality of shift forks (4, 6, 8) being engageable with a desired shiftable gear to be engaged;

the shift rail (2) having a plurality of coupling mechanisms (16, 18, 20, 22, 32, 42, 46, 50) for forming a gear shifting connection between the shift rail (2) and a desired one of the plurality of shift forks (4, 6, 8) to be engaged while the plurality of coupling mechanisms (16, 18, 20, 22, 32, 42, 46, 50) also forming a locking connection between each non-engaged shift fork (4, 6, 8) and the transmission housing to prevent each non-engaged shift fork (4, 6, 8) from engaging a gear, the coupling mechanisms (16, 18, 20, 22, 32, 42, 46, 50, 76) comprise a plurality of crank rods (46, 50, 76) supported within a bore formed in the shift rail (2), and each crank rod (46, 50, 76) extends perpendicular to the longitudinal axis of the shift rail (2) for facilitating the shift connection between the shift rail (2) and the desired one of the plurality of shift forks (4, 6, 8);

the coupling mechanisms (16, 18, 20, 22, 32, 42, 46, 50, 76) having a plurality of detents facilitating the shift connection between the shift rail (2) and the desired one of the plurality of shift forks (4, 6, 8) to be engaged and the locking connection between each non-engaged shift fork (4, 6, 8) and the transmission housing;

wherein each shift fork (4, 6, 8) is supported by the shift rail (2) via an associated coupling hub (16, 18 20);

one of the plurality of detents (22, 32, 42) forms the locking connection between each non-engaged shift fork (4, 6, 8) and the transmission housing (30) when the coupling hub (16, 18 20) receives a spring biased detent pin fixedly supported by the transmission housing (30); and one of the plurality of detent pins (46, 50, 76) enables the gear shifting connection between the shift rail (2) and the desired one of the plurality of shift forks (4, 6, 8) to be engaged by facilitating coupling between the coupling hub (16, 18 20) to the shift rail (2).

6. A shift mechanism for engagement of selected gears in a multi-ratio gear transmission of a motor vehicle, the shift mechanism comprising:

a transmission housing encompassing an axially displaceable and rotatable shift rail being aligned in parallel with a set of gear axes also disposed within said transmission housing, the transmission housing further biasly supporting a plurality of detent pins;

a plurality of crank rods being fixedly supported within a bore formed in the shift rail, the crank rods extending perpendicular to the longitudinal axis of the shift rail;

a plurality of coupling hubs being supported on said shift rail, the coupling hubs including a detent for accepting one of said detent pins and said crank rod, and each said coupling hub further having a shift fork for engagement of a selected gear;

each said coupling hub and shift fork having one of an engagement and non-engagement position with said selected gears, the engagement position being defined by one of said crank rods engaging one of said coupling hubs via said detent to axially and rotatably fix said coupling hub to said shift rail; and said non-engagement position defined by the remaining coupling hubs being immovably affixed to the transmission housing via said detent pin engaging said detent wherein said coupling hub and shift fork are held immovable with respect to said rotating and displacing shift rail.

7. The shift mechanism according to claim 6 wherein when one of said shift forks and one of said coupling hubs are in said engaged position said detent pin axially aligns said coupling hub in a proper engagment position via a recess adjacent to said opening, and said crank rod rotatably affixes said coupling hub to said shift rail.

* * * * *